United States Patent [19]

Peacock

[11] Patent Number: 4,900,596
[45] Date of Patent: Feb. 13, 1990

[54] WRAPAROUND FABRIC ARTICLE AND METHOD OF MAKING THE SAME

[75] Inventor: Donald Peacock, Gloucestershire, England

[73] Assignee: Raychem Corporation, Menlo Park, Calif.

[21] Appl. No.: 934,599

[22] Filed: Nov. 21, 1986

[30] Foreign Application Priority Data

Nov. 25, 1985 [GB] United Kingdom ............... 8528966

[51] Int. Cl.⁴ ................... B32B 31/12; B29C 61/06
[52] U.S. Cl. .................................. 428/34.5; 156/86; 156/215; 156/148; 174/DIG. 8; 264/230; 264/342 R
[58] Field of Search ............... 156/86, 52, 53, 215, 156/148; 138/99, 97, 156; 264/230, 342 R; 174/DIG. 8; 428/34.5

[56] References Cited

U.S. PATENT DOCUMENTS

| | | | |
|---|---|---|---|
| 2,027,962 | 1/1936 | Currie | 18/55 |
| 3,086,242 | 4/1963 | Cook et al. | 18/1 |
| 3,364,102 | 1/1968 | Spence et al. | 264/342 |
| 3,455,336 | 7/1969 | Ellis | 138/156 |
| 3,597,372 | 8/1971 | Cook | 260/4 |
| 3,966,865 | 6/1976 | Nishida et al. | 264/DIG. 47 X |
| 4,276,909 | 7/1981 | Biscop | 264/230 X |
| 4,366,201 | 12/1982 | Changani et al. | 174/DIG. 8 X |
| 4,379,473 | 4/1983 | Kunze | 138/99 X |
| 4,624,720 | 11/1986 | Pithouse et al. | 156/86 |

FOREIGN PATENT DOCUMENTS

| | | |
|---|---|---|
| 0116392 | 8/1984 | European Pat. Off. |
| 0116393 | 8/1984 | European Pat. Off. |
| 0127457 | 12/1984 | European Pat. Off. |
| 0133337 | 2/1985 | European Pat. Off. |
| 2412991 | 7/1979 | France |
| 1440524 | 6/1976 | United Kingdom |
| 2134334 | 8/1984 | United Kingdom |

Primary Examiner—David Simmons
Assistant Examiner—Jeff H. Aftergut
Attorney, Agent, or Firm—A. Stephen Zavell; Herbert G. Burkard

[57] ABSTRACT

A method of making wraparound fabric article comprises positioning a closure member(s) at an edge portion of a sheet of fabric (1), and welding or bonding (a) fibers of the fabric adjacent to the closure member so as to trap the closure member by preventing of reducing relative movement of fibers at the edge portion (2). Preferably, the method involves attaching two closure members to the fabric, by which the article can be held in a wrapped around configuration.

20 Claims, 5 Drawing Sheets

WRAPAROUND FABRIC ARTICLE AND METHOD OF MAKING THE SAME

This invention relates to wrap-around fabric articles, in particular to dimensionally recoverable articles.

A recoverable article is an article the dimensional configuration of which may be made substantially to change when subjected to treatment such as heating. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One method of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is heat-unstable. Application of heat will cause the article to assume its original heat-stable shape. A further method comprises deforming a substantially non-crosslinked polymeric material at a temperature below the crystalline melting point or softening point of the material, fusing together parts of the material or a part or parts of the material and at least one other polymeric component to produce the configuration of at least one hollow heat-recoverable article and subsequently cross-linking the substantially non-cross-linked material.

In other articles, an elastomeric member is held in a stretched state by a second member, which, upon heating weakens and thus allows the elastomeric member to recover. Heat-recoverable articles of this type are described, for example, in British Patent No. 1,440,524 in which an outer tubular elastomeric member is held in a stretched state by an inner tubular member.

Heat-recoverable articles have found particular use in the environmental protection of elongate substrates such as for example splices in telecommunication cables.

In addition to making the environmental seal the sleeve may be required to withstand an internal pressure, either because the complete splice enclosure is pressure tested for leaks, for example in the Bell and British Telecom specifications, or because temperatures reached in service create a significant internal pressure. Whereas the known heat-recoverable sleeves are quite suitable for the conditions encountered with distribution splice enclosures, many larger telecommunication cables are internally pressurised to exclude moisture and the thicker-walled or reinforced sleeves which would be required to withstand such pressures long term are more difficult and expensive to manufacture and require greater skill to install in the field.

It is often convenient to be able to install a recoverable article by wrapping it around the substrate thus avoiding totally severing the substrate. An example of this is during repair to a multi-conductor telephone cable: only a small number of the many conductors may be affected, and much time would be lost if the entire cable had to be severed in order to install a new tubular enclosure over the cable. Wrap-around products are also useful where space is limited: a wrap-around sleeve can be installed where the length of substrate accessible merely equals the width of the sleeve; a tubular sleeve however requires room for it to be shifted along the substrate away from the splice region while the splice is being made.

Closures for recoverable wraparound articles have been known for many years and are described in the patent literature. Adhesives in general cannot resist the very large forces which can be generated during recovery of the article, and it has been found necessary for most applications to employ a wraparound sleeve provided with profiled edge regions which can be engaged to form a mechanical closure. Although many such proposals are known, for its ease of assembly in the field, its strength and longitudinal flexibility under recovery conditions, the closure of Ellis U.S. Pat. No. 3,455,336 remains the only commercially successful design for extruded sheet material. Wrap-around recoverable fabrics and various closure mechanisms therefor are disclosed in GB No. 2,134,334.

We have now designed a specific method of making a wraparound fabric article within the general type disclosed in GB No. 2,134,334.

Thus, the invention provides a method of producing a wrap-around article comprising a fabric and having a first closure member fixed with respect to the fabric at an edge portion of the article by means of which member edge portions of the article can be held together to maintain the article in a wrapped around configuration, which method includes:

(a) positioning said first closure member at said edge portion thereby forming a region of the article of increased thickness;

(b) welding or bonding fibre of the fabric adjacent said first closure member; and (c) optionally cross-linking the weld or bond; steps (b) and (c) trapping the first closure member by preventing or reducing relative movement of fibres at said edge region.

. We prefer that cross-linking step (c) be carried out. A separate cross-linking step may, however, not be necessary for example when formation of a bond in step (b) comprises a cross-linking chemical reaction.

The fabric preferably has a recovery ratio of at least 20%. Recovery ratio, when expressed as a percentage, means the change in a dimension as a percentage of the dimension before recovery. The figure should be measured by determining the change that occurs on a single treatment by the appropriate agency such as heat, and not repeated and prolonged treatment over a long period of time. We prefer the recovery ratio of the fabric to be at least 40%, especially at least 50%, particularly at least 75%.

We prefer that the article includes a second closure member (preferably produced in the same way as the first closure member) such that the first and second closure members can be held together, for example by sliding over them a channel substantially C-shaped in cross-section, to maintain the sleeve in a wrapped around configuration.

The closure member may comprise for example a cord or thick yarn, a rod or wire or rope or other elongate member woven into edge portions of the fabric. The elongate member will in general be of considerably greater thickness than the fibres of the fabric. An alternative, in the case of a woven fabric, is the provision of hollow pockets at the edge portions, into which pockets are inserted rods, wires or ropes etc.

In either case, the weave, braid or knit etc. of the fabric is stabilized adjacent the rod, wire or rope etc. by welding or bonding and cross-linking. This treatment prevents or reduces relative movement between fibres of the fabric.

Fabrics can often have significant advantages when used as recoverable wrap-around articles, especially when used for environmental sealing. The following description will be made primarily in terms of a recoverable fabric. Fabrics can provide excellent pressure retention due to their ability to accommodate hoop stresses. They are also highly resistant to cut or scratch damage due to their poor notch propagation. Also, they can easily be built up from or reinforced by fibres whose chief property is tensile strength. Glass and Kevlar (a trade name for an aromatic polyamide) are particularly useful. Such strength fibres will generally run tranverse to recoverable fibres and will thus give the wraparound article considerable axial strength. They will also make a contribution to radial strength since radial expansion cannot occur without tension in the longitudinal fibres.

In one embodiment, the article produced by the method of the invention preferably forms part of a dimensionally heat-recoverable article comprising a composite structure (formed for example by lamination) of a heat-recoverable fabric and a polymer matrix material wherein:

(a) the heat-recoverable fabric comprises fibres that will recover when heated, the fibres having a recovery stress Y of at least $5 \times 10^{-2}$ MPa at a temperature above their recovery temperature; and (b) the polymer matrix material has an elongation/temperature profile such that there exists a temperature (T) which is at or above the recovery temperature of the fibres at which temperature the polymer matrix material has an elongate to break of greater than 20% and a 20% secant modulus X of at least $10^{-2}$ MPa (measured at a strain rate of 300% per minute), and at which temperature the inequality (1) is satisfied:

$$\frac{X}{Y} \frac{(1-R)}{R} \text{ is less than one} \quad (1)$$

where R is the mean effective volume fraction of heat-recoverable fibres in the composite structure along a given direction based on the total volume of the composite structure, or relevant portion thereof.

In a further embodiment, the article produced by the method of the invention provides the fibres of a recoverable composite structure comprising a cross-linked polymeric material and cross-linked recoverable fibres by virtue of which the composite structure is recoverable.

Such a recoverable composite structure can be made by applying to the cross-linked recoverable fibres the polymeric material, and then cross-linking the polymeric material.

The fibres from which the fabric may be woven or otherwise produced may be cross-linked to increase their post-recovery recovery strength, and a recovery stress of at least 0.1 MPa, preferably 0.5 to 5 MPa will be suitable. The polymeric material is desirably cross-linked to prevent it dripping or running during heat recovery. Too much cross-linking of the polymeric material will, however, reduce the recovery ratio of the composite. This may be a problem since a different cross-linking treatment may be required in the fibres and the polymeric material. This is a reason for the two cross-linking steps being carried out separately above. The problem may arise due to different cross-linking responses (beam response in the case of irradiation cross-linking) of the materials used for the fibres and the polymeric material, or due to the treatment undergone by the fibres and polymeric material. This second effect includes a reduced beam response of the fibres that results from their orientation produced by drawing to make them recoverable.

The composite structure may, nonetheless, be produced using a single cross-linking step if the beam response of the recoverable fibres relative to that of the polymeric material is such that a post-irradiation recovery stress of the fibres, per se, of at least 0.1 MPa can be reached before the recovery ratio of the composite structure is reduced to a value of 70% of that of the unirradiated composite structure.

The relative beam response may be produced by the presence of prorads in the recoverable fibres and/or antirads in the polymeric material.

In a preferred embodiment of the invention the fabric is incorporated into a flexible recoverable composite structure comprising the recoverable fabric and a polymeric matrix material laminated thereto, in which:

(a) the recoverable fabric comprises a cross-linked recoverable polyolefin having a recovery stress of 0.5 to 5 MPa; and (b) the matrix is cross-linked such that the recovery ratio available in the composite is at least 65% of that available in the free fabric, and the polymeric matrix material, per se, after irradiation has a room temperature elongation of at least 350%, preferably 400-700% measured at a strain rate of 300% minute.

Irradiation, in addition to providing one means of cross-linking, can provide other features in the composite structure. If the fibres are irradiated, particularly in the presence of oxygen, before application of the polymeric material then a change in the surface properties of the fibres may occur (such as oxidation) which improves adhesion between the fibres and the polymeric material. An irradiation step after application of the polymeric material may also aid such bonding by forming a cross-linked bond between the two components of the composite structure.

Also, or instead, depending on the conditions under which the polymeric material is applied, some mechanical interlocking between the fibres and the polymeric material may be provided.

In general the article comprises heat-recoverable fibres having a minimum recovery stress of $10^{-1}$ MPa and more preferably $5 \times 10^{-1}$ at a temperature above the transition temperature of the fibres. There is no upper limit of recovery stress, but in practice 200 MPa and more usually 10 MPa is the highest figure normally achievable with polymeric fibres. As mentioned above, a range of 0.5 to 5 MPa will be typical.

The fibres are preferably formed from a polymeric heat-recoverable material. Alternatively, a fabric may be made from substantially dimensionally stable fibres and then deformed for example by stretching to render it as a whole recoverable. By the "recovery temperature" of polymeric heat-recoverable material is meant that temperature at which the recovery of the polymeric material will go substantially to completion. In general, the recovery temperature will be the crystalline melting transition temperature if the polymer is crystalline or the glass transition temperature if the polymer is amorphous.

The heat-recoverable fibres are preferably formed from a polymeric material that imparts good physical properties and, in particular, good creep resistance to the sleeve. Olefin polymers such as polyethylene and ethylene copolymers, polyamides, polyesters, acrylic polymers and other polymers capable of being cross-linked may be employed. A particularly preferred polymeric material for the fibres is high density polyethylene (for example having a density of from 0.94 to 0.97/gms/cc, an Mw of from $80 \times 10^3$ to $200 \times 10^3$ and an Mn of from $15 \times 10^3$ to $30 \times 10^3$), but also medium density and linear low density polyethylene may be used.

We prefer that the recoverable fibres comprise fibrillated material such as film fibre. Film fibre may be produced by any suitable technique from polymeric film, and may be contrasted with spineret fibre. In general, film fibre is produced by splitting or slitting a film, preferably a stretched film and the resulting fibres will generally have a rectangular cross-section. The material of the fibres may be cross-linked while as film, or after splitting or slitting. In the latter case, cross-linking may be carried out before or after the fibre is incorporated into the fabric.

A preferred technique for producing film fibre is roll-embossing, such as that used in the REF process of Shell and Smith and Nephew.

The fibrillated fibre may be formed into multi-filament bundles, alone or with other fibres. The bundles preferably are of 30–2000 tex, more preferably 200–600 tex, especially about 450 tex. The fibres within the bundle may be held together by the bundle being twisted, for example from 0.05 to 5, especially about 0.25 turns per cm. The number of fibres within each bundle is not critical and further splitting may occur during processing and use of the fibres. Typical numbers may be from 2–500, preferably from 20–200, especially about 50. Alternatively the fibrillated tape may be woven in the untwisted form.

An advantage of the use of fibrillated fibre, rather than simple monofilaments or normal multi-fillament bundles is that a high loading of such fibres can be achieved without thread densities unacceptably high from the point of view of commercial weaving cost. This is particularly useful where these fibres are to provide a recoverable weft, rather than warp. If monofilaments or normal multifilament yarns were to be used, the number of insertions per cm required to achieve the requisite recovery force would be too high for a useful commercial weaving process. The flexibility of bundles of film fibre allows this problem to be overcome, since the bundles can deform or flatten as necessary on weaving to produce a flat smooth fabric.

Preferably the recovery temperature of the fibres is 60° C. or more, most preferably from 80° C. to 250° C., such as, for example 100°–150° C.

When the fibre is cross-linked by irradiation it is convenient to incorporate the cross-linking step into manufacture of the fibre, although the fabric may be cross-linked, optionally after lamination of a polymeric matrix material thereto. The fibre can be extruded, stretched at a temperature below its melting temperature, preferably by an amount of from 600 to 2000%, then subjected to irradiation to effect cross-linking. An alternative way of making the fibre is to extrude the fibre, irradiate to cross-link, then heat the fibre, preferably to above its melting temperature, stretch the fibre, and then cool the stretched fibre. High density polyethylene fibres are preferably irradiated with a dose of from about 2 to about 35 megarads, preferably from about 5 to 25 megarads, and in particular from about 7 to about 18 megarads especially from 10 to about 18 megarads. Usually the gel content of the cross-linked fibre is greater than 10%, preferably greater than 20%, most preferably greater than 40%. In practice, gel contents greater than 90% are not easily achievable.

The heat-recoverable fabric can be made of only heat-recoverable fibres as described above or can contain other fibres in addition to the heat-recoverable fibres. Such additional fibres may be provided to give the fabric tensile strength, or merely to aid incorporation of the recoverable fibres into a matrix material. Where the fabric contains such other fibres in addition to the heat-recoverable fibres R in equation (1) relates only to the heat-recoverable fibre component. Examples of suitable non-heat recoverable fibres that can be incorporated include glass and rayon. Preferably the fabric is woven from warp fibres comprising glass, and from dimensionally recoverable weft fibre. The fabric can be knitted (for example weft and warp insertion warp knitted), woven, non-woven (in particular stitch-bonding), braided, or the like. The recoverable fibres can form part of the fabric itself as it is made or may be additional and inserted after production of the basic fabric. The fibres of the fabric may be monofilaments or multifilaments, and also staple fibres, wires or tapes, but preferably comprise bundles of film fibre as described above. In a preferred embodiment the fabric is a woven fabric. A single ply weave may be used, or where a higher density or thicker fabric is desired a multiple ply weave may be used. The fabric may be a weave containing heat-recoverable fibres in one direction and non-heat-recoverable fibers in the other. This produces a heat-recoverable fabric which is recoverable in only one direction. The fabric can be woven in a pattern, for example, twill, broken twill, satin, sateen, Leno, plain, hop sack, sack, honeycombe, mock-leno, gauze, matt and various weave combinations. A single layer of fabric may be used or the article may comprise a laminate of two or more layers, optionally bonded together with a simple layer of adhesive or including a thicker layer interposed between the fabrics.

The heat-recoverable fabric is preferably bonded to, and preferably embedded in, a polymer matrix material as mentioned above. A function of the matrix may be to render the fabric substantially impervious. The matrix material may be provided by lamination to one or both surfaces of the fabric. At or above the recovery temperature of the fibres the polymer matrix material should be capable of limited flow under pressure so that it retains the integrity of the composite structure without substantially impeding recovery of the fibres. It preferably has, at the aforesaid temperature, an elongation to break of greater than 50%, most preferably greater than 100% especially from 400 to 700%, and a 20% secant modulus of preferably at least $5\times 10^{-2}$ MPa, most preferably at least $10^{-1}$ MPa, measured at a strain rate of 300% per minute.

The specified properties of the polymer matrix material need not necessarily apply after recovery. Thus, for example, the polymer matrix material may eventually cure to a thermoset on heating, provided that the cure rate is sufficiently slow under the recovery conditions not to affect adversely the above-mentioned physical properties of the polymer matrix material during the recovery of the fibres. However, for many purposes, room temperature flexibility is desirable.

The polymer matrix material can be either a thermoplastic or an elastomer. Examples of the former class of polymers include ethylene/vinyl acetate copolymers, ethylene/ethyl acrylate copolymers, polyethylenes including the linear low, low density and high density grades, polypropylene, polybutylene, polyesters, polyamides, polyetheramides, perfluoroethylene/ethylene copolymer and polyvinylidine fluoride. Considering the second class of materials this can include acrylonitrile butadiene styrene block co-polymer, acrylic elastomers including the acrylates and methacrylates and their copolymers, e.g. polybutyl acrylate, and poly 2-ethyl hexylacrylate, the high vinyl acetate copolymers with ethylene (VAE's), polynorbornene, polyurethanes and silicone elastomers and the like. The matrix material can be cross-linked, for example a cross-linked ethylene/vinyl acetate copolymer, linear low density or high density grade polyethylene or acrylic elastomer. The material can be cross-linked by irradiation or by other means such as chemical cross-linking using, for example, a peroxide crosslinking agent, provided that the physical properties of the matrix at the recovery temperature are as specified after the cross-linking step. Where irradiation is used, a dose of 10 megarads or less, in particular from 3–7 megarads, is preferred. The resulting extent of cross-linking allows the matrix to recover with the fabric and also prevents the matrix running or dripping during heat recovery. The recovery ratio of the composite after irradiation is preferably at least 50% especially at least 70% of that before irradiation. These dose values may be regarded as typical for olefinic polymers such as polyethylene of low orientation, and the skilled man will be able to select suitable dose values depending on the presence of various concentrations of prorads or antirads, if any.

The heat-recoverable fabric is preferably bonded to the polymer matrix material, and this bonding may be adhesive, that is to say by chemical or physical surface interaction, or mechanical interlocking.

Preferably the heat-recoverable fabric is embedded one or more polymer matrix materials thereby forming a composite structure. By "embedded" is meant that the polymer matrix material or materials surrounds at least a major portion of the fibre surface area of the fibres making up the fabric.

The fibres are preferably totally surrounded by polymer matrix material, but it is possible and at times desirable that substantially less than the total fibre surface area be contacted by polymer material. Sufficient fibre area should be bonded to the polymer matrix material or interlocked therewith to result in a composite structure which retains its integrity during recovery of the article. For the avoidance of doubt it is here stated that the term matrix is used include materials which (partially or totally) surround the fibres and also those materials which are merely affixed to a surface of the fabric but which do not penetrate the interstices of the fabric.

Preferably the polymer material at least on the surface of the composite structure facing the source of heat is substantially unstressed and is at least 0.03 mm especially at least 0.2 particularly 0.2 to 2 mm in thickness. Such polymeric material preferably softens during recovery but has a sufficiently high viscosity that it is retained by the fabric. This improves the ability of the composite structure to be heat recovered using a conventional propane torch.

In the composite structure, the ratio of the volume occupied by the heat-recoverable fibres of the fabric to the total volume of the composite is preferably at least about 0.01:1, more preferably from about 0.1:1 to about 0.8:1 and most preferably from about 0.2:1 to about 0.4:1.

In the composite structure the heat-recoverable fibre volume in any given unit volume of composite should be chosen according to the fibre strength, polymer matrix strength and the integrity of the fibre/polymer matrix structure under recovery conditions.

We have found that an acceptable recoverable product results if the inequality (1) mentioned above is satisfied, viz:

$$\frac{X}{Y} \frac{(1-R)}{R} < 1 \tag{1}$$

Wherein X is the 20% secant modulus of the polymer matrix material and Y is the recovery stress of the fibres, both at a temperature T above the recovery temperature of the fibres, and R is the mean effective volume fraction of heat-recoverable fibres in the composite structure.

$$\text{Preferably } \frac{X}{Y} \frac{(1-R)}{R} < 0.5 \text{ most preferably } < 0.05.$$

The composite structure can be formed for example by laminating (which includes extrusion coating) or otherwise applying one or more layers of polymer matrix material to the heat-recoverable fabric. Sufficient heat and pressure is applied so that at least a major part of the fabric is bonded to the polymer matrix material, or so that a significant amount of interlocking occurs. The result is a composite structure which on application of heat recovers as a unit.

Other methods of applying the fabric to the matrix can be used, for example, impregnation, calendering, solution coating, slurry coating powder coating, reactive prepolymers, e.g. acrylic prepolymers activated by UV or peroxide, and the like. In any application method employed sufficient heat to cause the fabric to recover to any significant extent should be avoided (for example by use of a sufficiently high processing speed), unless the fabric is suitably restrained from recovery.

Since the recoverable fabric may comprise individual recoverable fibres, the fibres at the edge portion must be individually retained in order to prevent unravelling or fraying of the fabric during recovery. Also the recoverable fibres at one of the edge regions to be joined must be secured to the fibres (which may be the other ends of the same fibres) at the other edge region in order that the fabric remains in the wrapped around configuration during recovery. The closure member must therefore either grip the fibres directly or grip the matrix; and the present invention provides a way whereby the closure member may grip the fibres.

The recoverable fibres of the fabric need not terminate at the edge regions. For example, they may be formed into loops, or the fabric itself looped around, so as to provide a passage for receiving an elongate member, for example a rod, which extends along the edge region. In this case the welding or bonding and if necessary subsequent cross-linking may be provided along the fabric at the inside of the rod to prevent the loops unfolding. If the fibres do not fold around the rod, the welding etc may be provided outside (and optionally also inside) the rod to trap the rod within the weave.

The fibres may be fixed by coating or impregnating the fabric with a composition which prevents the fabric from unravelling. The composition should be able to retain the integrity of the fabric under those conditions that will be applied to the fabric to cause its recovery. Where, for example, the fabric is heat recoverable, the composition must be suitably heat resistant. The recovery temperature is preferably 60° C. or more, more preferably 80°-250° C., such as 100°-150° C., and the composition should not melt unduly at such temperature. The composition may be a thermoplastic material or an elastomer. Examples of thermoplastic materials include ethylene/vinyl acetate copolymers, ethylene/ethyl acrylate copolymers, LLDPE, LDPE, MDPE, HDPE, polypropylene, polybutylene, polyesters, polyamides, polyetheramides, polyfluoroethylene/ethylene copolymers and polyvinylidene fluoride. Suitable elastomers include ABS block copolymers, acrylic elastomers, VAEs, polynorbornenes, polyurethanes and silicone elastomers. The composition is preferably a cross-linked material, for example cross-linked ethylene/vinyl acetate copolymer, LLDPE, HDPE or acrylic elastomers.

The composition can be applied to the fabric over its entire surface and may be the same as the previously mentioned polymeric material, or it may be applied at localised regions such as edge regions.

The ability of a recoverable fabric composite to be penetrated allows the edge regions to be held together by various means. Also, various complex tubular articles, such as bends, elbows and tees or branch-offs, may be made from simple tubular articles or from open sheet. In general terms, therefore, two or more portions of composite structure may be joined together by means of a mechanical joining arrangement that penetrates the fabric. The joining arrangement may be for example one or more lines of stitches or one or more staples which are prevented from causing a run in the fabric by the welding or bonding operation. The portions joined together may be discrete or may merely be separate portions of a single piece of composite material. Where stitching alone is used each line of stitches preferably has from 200-800 stitches per meter, and the line of stitches closest to an edge of the fabric is preferably separated from that edge by at least four rows of fibres and in the case of high float fabrics such as sateens where the high float is perpendicular to the join line, a spacing of at least six rows may be preferred. This will correspond to an edge overlap of at least 8-10 mm, preferably at least 16 or 20 mm for the fabric types preferred. The bonding or welding operation of the invention allows these overlaps to be reduced considerably. A hem may, of course, be provided but this will increase the thickness of the fabric and this may not be desirable. In order to reduce the possibility of breakage of the heat-recoverable fibres by the stitching (or stapling), the needles (or staples) should be very sharp at their tips and have a maximum used diameter of the same order of magnitide as the distance between the heat-shrink fibres of the fabric.

Step (a) in the method of the invention of positioning the closure member at the edge portion thereby forming a region of the article of increased thickness can be carried out by interweaving the first closure member into the fabric during production of the fabric. This may be carried out by interweaving the closure member as one of the warp ends during production of the fabric. Alternatively the closure member can be positioned by inserting it into a pocket woven into the fabric.

In one embodiment of the invention, a weft-recoverable fabric is woven having considerably thicker warp fibres at its edges than over its central region, or at repeated positions across its width rather than continuously across its width. The central region will form at least the major part of the wrap-around article, and the thickened edges will form the closure members to be held together by for example a closure channel. The closure members are trapped within the fabric by the bonding or welding operation. In general, it will be necessary for only a single warp thread at each edge of the fabric to be thicker, although if the difference in thickness referred to is only small it may be preferable to employ several thicker fibres at each edge. The thickened edge regions can be regarded as rails as illustrated in U.S. Pat. No. 3,455,336, since when they are brought together with the fabric in the wrapped configuration they show in cross-section a narrower portion adjacent to, and a wider portion remote from, the surface of the fabric. A channel, substantially C-chaped in cross-section, may be slid over these closure elements or rails to hold them together. The shape of the rails causes the channel to be retained during recovery of the fabric. Alternatively, a series of clips or clamps, or other means, could be provided spaced along the length of the thickened warp fibres.

A similar result can be achieved by inserting a rod or other elongate member into the weft at each edge region of a weft-recoverable fabric. It is not, of course, necessary that each such rod catches every pick, so long as the recovery forces can be uniformly transmitted to the rods to avoid unwanted buckling, of the fabric on recovery. As before, the two rods, which constitute the closure elements are brought together and held together by, for example, a C-shaped channel that grips both rods and the fabric which surrounds them.

Another embodiment, involves a fabric (rather than just recoverable fibres) which is effectively continuous and can provide, for example, a loop which can trap a rod or other elongate element. As above, two such rods at opposite portions of the fabric are brought together and secured by a C-shaped channel or other means. In one example a fabric is knitted having a central portion of single thickness and edge portion of double thickness which are formed as closed loops. The fabric would thus have the shape of a dumb-bell in cross section, held in that configuration by the welding or bonding operation. The fibre from which it is knitted may be recoverable, the fabric may have a warp or weft insertion of a recoverable fibre running from one of the loops to the other, or a stable fabric may be expanded or these ideas may be combined. An alternative to this is to produce a tubular fabric that has at least a component of recoverability running circumferentially, to flatten such a tube, and to use the flattened tube as a wrap-around sheet. A rod, for example, may be inserted into the tube adjacent what is now each edge of the recoverable sheet. The two rods can be secured together to hold the flattened tube in a wrapped around configuration.

The present invention may include the additional step of shaping edge portions of the fabric to provide a closure of the desired cross-sectional shape or orientation with respect to the rest of the sleeve. A recoverable fabric or composite may be folded over at an edge region to provide a loop, and this loop held in a vice. A closure member is provided within the loop and the looped part of the composite is then recovered preferably after the welding or bonding operation. During recovery, the loop may be deformed to give it a desired shape. It has been found that the resulting closure member retains its shape on removal from the vice (this may be ensured by precoating the internal surface of the loop with an adhesive), and since the portion of the composite that constitutes the closure member becomes dimensionally stable it has reduced tendency to pull out of any channel or closure means during recovery of the fabric article during its installation.

The closure member may comprises teeth, clamping bars, pressure plates, or other frictionally engaging means for gripping the individual fibres in the edge regions.

Reference is made to the closure member being situated at an edge portion of the article, rather than at an edge itself since we wish to include also the provision of a closure member spaced some distance from the edge. When the wrap-around article is used for environmental sealing it may be desirable to provide a seal (generally known as a flap) between the two edges of the fabric which are brought together when the fabric is in the wrap-around configuration. Such a seal can conveniently be provided by that portion of the fabric, referred to as a flap, which lies between an extreme edge and the adjacent closure member.

Preferably two closure members are provided and the first and second closure mechanisms can be held together to maintain the sleeve in a wraparound configuration. In one embodiment the article is produced by division of a fabric having two or more closure members. Preferably the fabric is a woven fabric with the first closure members in the warp direction, the fabric being split between two of the first closure members.

Instead of providing the flap as an integral part of the article, it may be separate. In this way the functions of holding the edges of the article together and of providing a seal can more readily be separated. This allows the various components to be optimised for their respective jobs. A separate flap is arranged to lie across the abutting or overlapping edges of the article and to be bonded to the edges. We have found that there are two requirements for a good permanent seal. Firstly the flap, the article and the adhesive must be chemically compatible to ensure a good bond or seal. Secondly, the moduli of the flap and the adhesive must be compatible if adhesion to the flap is not to fail during recovery of the article. The bond can be improved by surface treatment of the flap, for example by corona treatment or flame brushing, and by a good coating technique such as hopper-fed doctor blade coating. The adhesive is preferably an EVA or polyamide based hot-melt adhesive, particularly a polyamide having up to 10% of an acrylic rubber, based on the weight of the polyamide. We have found excellent results using a non-recoverable EVA based flap. The EVA should be beamed to a low dose, to retain a low modulus, comparable to that of the adhesive but sufficiently high to provide strength. The moduli of the flap and the adhesive preferably differ by less than 20%, more preferably by less than 10%, most preferably by less than 5%, based on whichever is the larger.

The closure members may run substantially continuously along the edge portions or there may be a series of separated closure members. An advantage of the closure members being discontinuous is that the resulting article may have greater flexibility: this is useful where the article is to be shrunk down over a substrate of non-uniform cross-section size since the closure members will be able to follow an irregular underlying shape.

The closure members may, by virtue of their shape, interlock or otherwise mechanically engage to hold the two edge regions of the fabric together during recovery. An example of such a closure is a zip. Each closure member can be regarded in such a case as possessing a feature by which it is fixed relative to the recoverable fibres at one edge portion, and a feature by means of which it is engaged to an other closure member.

In another arrangement there may be a separate device such as a closure channel which holds the two closure members together, or which hold them a certain fixed distance apart. The two ideas can of course be combined, in which case the closure members may interlock and be reinforced by a closure channel.

Whatever the closure mechanism, it will often be desirable to coat the fabric on that surface which will be inwardly facing when the article is in the wrapped configuration with a sealant, such as a mastic, or an adhesive such as a heat-activatable, particularly hot-melt, adhesive. Such a coating may be additional to the matrix referred to above for rendering the fabric substantially impervious, or it may be used alone. Alternatively, it is possible that the matrix may have sufficient deformability or tackiness, preferably only at elevated temperatures, to act as a sealant or adhesive. The presence of an adhesive or sealant is of particular use when the fabric article is to be used for environmetal sealing, for example of splices in cables.

Heat recoverable articles produced by the method of the invention, especially those comprising interwoven reinforcing fibres, have been found to be particularly suitable as splice cases for use in enclosing splices between pressurized or unpressurized telecommunication cables. The recovered article is exceptionally resistant to the effects of pressure and preferred embodiments have sufficient hoop strength to resist rupturing under 70 kPa pressure (the pressure typically used in pressurized telecommunication systems) at ambient temperatures of such systems. When the fabric is used in conjunction with a matrix material or polymeric coating it can easily provide sufficient imperviousness to retain such pressure over long periods of time. The closure design will be chosen according to the desired degree of imperviousness, and the various flap systems described have been found to be ideal. Other uses include the repair to lengths of cable or the repair or protection of pipes or pipe joints for, say, gas oil or air. A further use is in attaching, for example, a cable or a pipe to an elongate substrate. Due to the length of the cable, pipe, or substrate, the attachment means is desirably of the wraparound type. In many cases, such attachment must withstand severe mechanical and environmental stresses, and we have found that an article produced by the method of the invention is particularly suitable.

Where the fabric article is to be used as a cable splice case it is preferably used with a liner or canister that surrounds the cable splice and around which the fabric article is wrapped and then recovered. The liner or canister provides the splice with mechanical protection and may act as a moisture barrier. The article of the invention may be used around splices between branching cables (as opposed to simple in line splices) in which case a branch-off clip may be positioned on an end of the article between the branching cables. The clip is positioned before recovery and it provides a seal in the crutch region between the cable. The reader is referred to GB No. 1604981 for a discussion of branch-off clips.

The invention is further illustrated by the accompanying drawings, in which.

Figure 1:
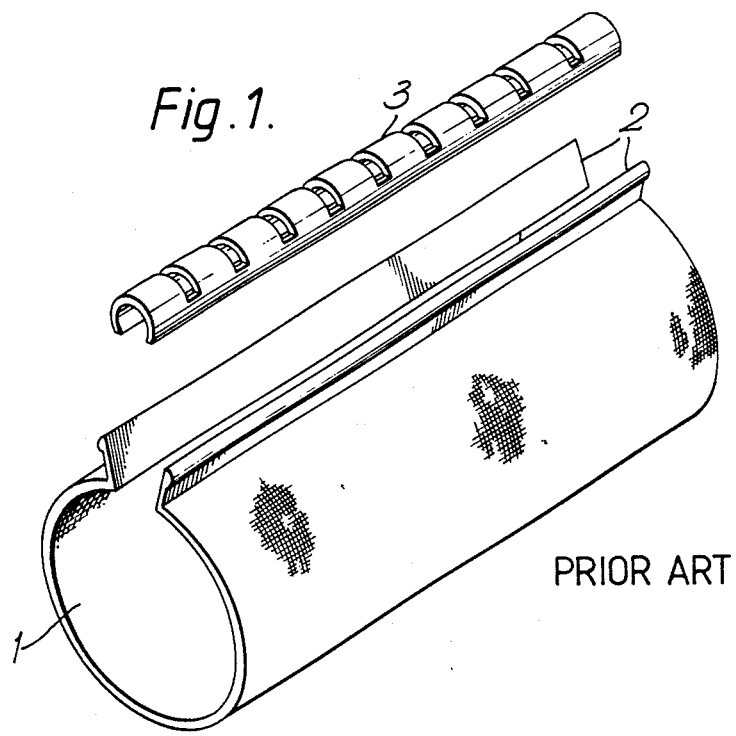
FIG. 1 shows a prior art wrap-around fabric sleeve.

FIG. 1 shows a wrap-around fabric sleeve 1 having closure members 2 fixed at its edges. The closure members can be held together by a closure channel 3 to maintain the sleeve in a wrapped around configuration. The sleeve may be used to surround a pipe or a cable etc to provide environmental protection. Where the sleeve is dimensionally recoverable, it may be recovered into engagement with the pipe or cable to provide enhanced protection. The closure members 2 may be attached to the edges of the sleeve by bonding them to its surface. It may be desirable that a flap underlies the members 2 when they abut one another, in which case one of the members 2 may be set back a small distance from the edge of the sleeve to provide such a flap.

Figure 2:
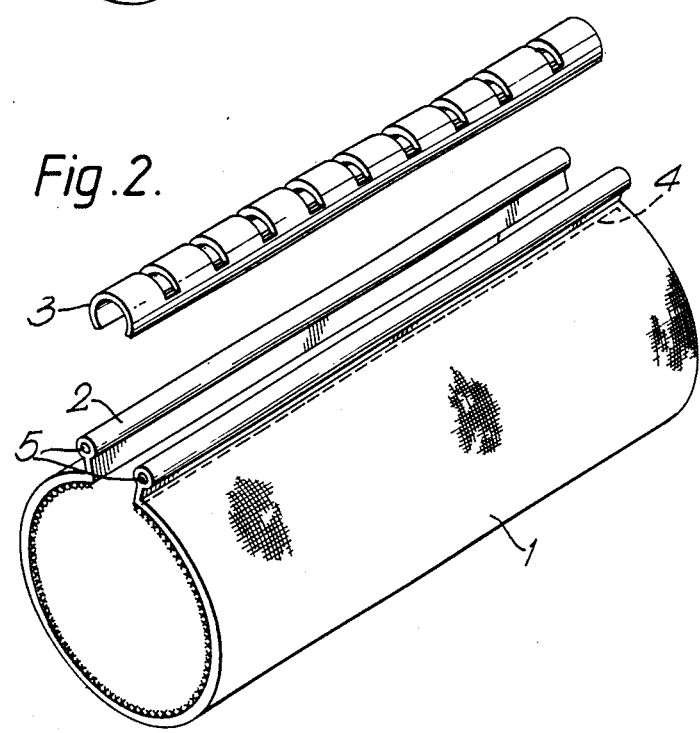
FIG. 2 shows a wrap-around fabric sleeve produced by the method of the invention.

The invention is illustrated by the remaining Figures. In FIG. 2, thickened edge portions 2 of an article in the form of a sleeve are produced by trapping closure members 5 between the fibres of the fabric. The invention traps the closure members by means of a cross-linked weld or bond along lines 4. (A double dotted line is used simply to distinguish the weld or bond line from single dotted lines used elsewhere in the drawings; the weld or bond will however generally be provided along a single line.) In this configuration we prefer bonding to welding. The reason is that heat required for welding may cause a reduction in the tensile strength of the oriented recoverable fibres, although this can be avoided if suitable temperatures and fibres are chosen. Thus, a weld on the inside of the closure member is not a preferred feature.

The closure members may be additionally trapped in other ways, and this is the case in FIG. 2. In FIG. 2 the fibres of the fabric loop around the closure members 5 as can be seen by the lack of fibre ends at the top of the thickened edge portions 2 (compare FIG. 3a). The sleeve is provided with an internal coating of a sealant material, such as a hot-melt adhesive, and this is represented by the line of crosses at the left hand end of the sleeve.

The sleeve is preferably dimensionally recoverable, especially heat-shrinkable.

We prefer that the sleeve comprises a fabric together with a matrix material comprising a laminate of a polymeric material. The laminate (which may be additional to the sealant material referred to above) may be applied to one or both sides of the fabric and may penetrate its interstices. The laminate may be cross-linked, especially by beaming with an electron beam, although this may not be necessary if it has a sufficiently high viscosity that it does not flow excessively at the recovery or service temperature of the sleeve.

It is also preferred that the recoverable fibres of the fabric be cross-linked, especially by beaming, and this may be carried out in a single beaming step wherein the matrix is also cross-linked. To achieve this it may be desirable to add cross-linking promoters to the fibre and/or retarders to the matrix.

Where a polymeric material is to be laminated to each side of the fabric, the materials for each side may be the same or different. For example, one could be of lower viscosity than the other. In such a case, the material of lower viscosity could be applied to one side of the fabric, and the result could be subjected to cross-linking. The initial fabric may but need not have been cross-linked. After cross-linking, a laminate of higher viscosity, which does not require cross-linking, may be applied to the other side of the fabric. The welding or bonding operation along line 4 to trap the closure members may be carried out at any suitable stage, but we prefer that it occurs after the first, lower viscosity, laminate has been applied. In that case, the cross-linking operation, conveniently carried out by beaming, may serve also to cross-link the weld or bond. Both bonding and welding may of course be carried out. The preferred technique however, is welding and electron beam cross-linking. Welding may be carried out by a hot tool, such as rolls or wheels, or by RF or ultrasonic tools, or two or more of these may be employed.

The closure members 5 may be of any suitable construction, for example rope, cord, nylon rods, thick yarns, metal rods, multi-strand wire etc.

We prefer that the sleeve 1 is made by weaving. In particular we prefer that the warp runs parallel to the length of the sleeve and the weft, which runs circumferentially in the wrapped around product, is heat-shrinkable at least in the finished product.

Sleeves may thus be made in-line and cut-to-length. Where the weft is heat-recoverable we prefer that it comprises fibrillated fibres, especially bundles of film fibre, which may comprise high density polyethylene.

Figure 3A:
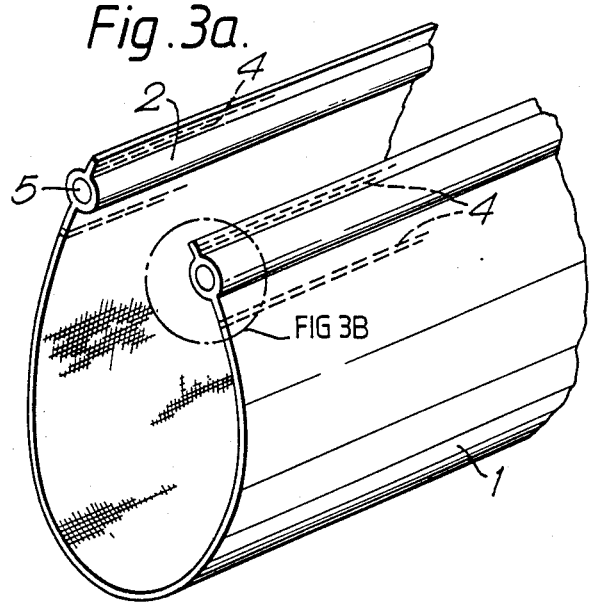
FIG. 3a and 3b show the weave design at an edge portion of a sleeve produced by the method of the invention.

In FIG. 3a the closure members 5 are trapped in the edge portions of the sleeve by the bonding or welding operation alone, and not partially by virtue of fibres of the fabric looping around them. The fabric can be seen to pass around the closure members 5 and terminate a short distance past them.

Figure 3B:
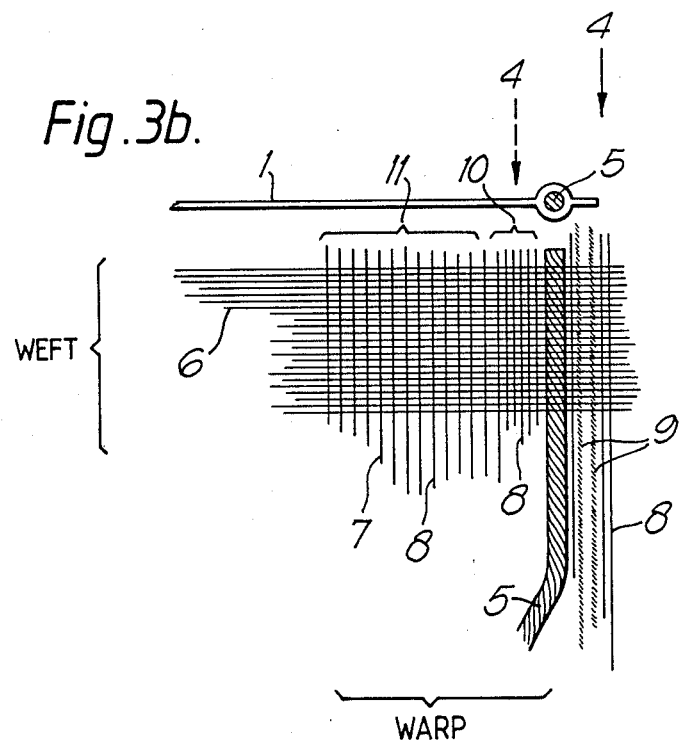

FIG. 3b is a diagrammatic view of the encircled edge portion of FIG. 3a. FIG. 3b is a transverse cross-section of the edge portion, and schematic plan view of the weave design. The closure member 5 preferably comprises a rod or rope or cord of nylon, polyester or rayon or a cord or rope of vegetable fibres (such as jute, cotton, sisal or flax) diameter 1–10 mm, especially about 4 mm.

The weft 6 preferably comprises recoverable high density polyethylene, especially in the form of bundles of fibrillated fibres. The warp 7 is preferably glass or rayon fibres 8, especially as multifilament yarns, across the majority of the width of the sleeve. Although it is less preferable, the warp and weft may be reversed.

The closure member 5 is trapped by bonding or welding together fibres of the fabric along lines indicated by the arrows 4. Bonding or welding indicated by the dotted arrow 4 is optional since the force imposed on the closure member 5 in its function of holding the sleeve in the wrapped around configuration is towards the edge of the sleeve.

Where trapping is by welding in the design above employing glass fibres, the welding will in general occur only between adjacent weft fibres. This will however be sufficient for most purposes. If a stronger closure is required, however, it may be desirable to employ in the warp some fibres 9 which are preferably thermoplastic and which can be welded to the weft fibres. Fibres 9 may comprise polyethylene, and may be of 200–600 especially about 400 tex. In general fibres 9 should be of the same type as fibres 6. The number of such fibres 9 is not critical, but we prefer from 1–10, especially 2–5. For ease of fitting of a closure channel (see item 3 in FIG. 2) the selvedge to the right of the member 5 in FIG. 3b should be as small as possible, say up to 5 mm especially about 3 mm.

Further reinforcement of the closure can be achieved if a higher warp density is provided at position 10 than is required over the remainder of the fabric, position 11. The warp density at position 11 is preferably 1–8 especially 3–5 ends per cm. The weft density is preferably 1–16, especially 6–10 picks per cm. A leno, gauze or mock-leno weave is preferred where the weft and warp densities are low.

At least one fibre 8 is preferably provided between fibres 9 and the member 5 in order to increase the stability of the weave on the right hand side as drawn of the member 5 during the welding operation.

Figure 4:
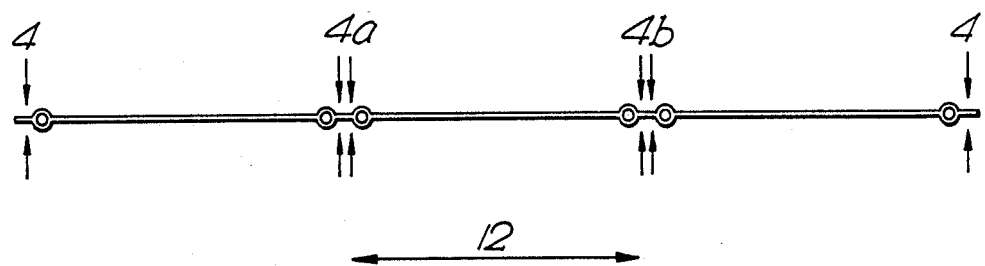
FIG. 4 shows the production of multiple widths of fabric.

FIG. 4 shows how a plurality of sleeves can be produced from one weaving line. The Figure is a transverse cross-section of a fabric as it comes off the loom. The closure members 5 may be inserted into pockets woven into the fabric or they can be woven directly into the fabric. The closure members thus run in the warp or machine direction, and the weft is preferably dimensionally recoverable. The weave illustrated may be slit or cut in the warp direction to produce three sleeve, which may then be cut to length. The sheet will have a width as indicated at 12.

The welding or bonding operation will be carried out at the positions marked by the arrows 4. The operation may be carried out from both sides of the fabric or from only one side. The regions between each individual sheet may be subjected to two weld or bond line as shown at 4a or to one such line as shown at 4b. In the first case, slitting or cutting may occur between the two lines, and in the second case, the weld or bond is preferably wide enough for the slit line to split it. If desired, weld or bond lines can be made on the opposite side of each closure member 5 to that indicated by the arrows 4.

If desired, the sleeve may be subjected to a crosslinking treatment such as beaming over all or most of its surface. An alternative or additional treatment is to produce a localized cross-linking of the weld or bond.

Figure 5:
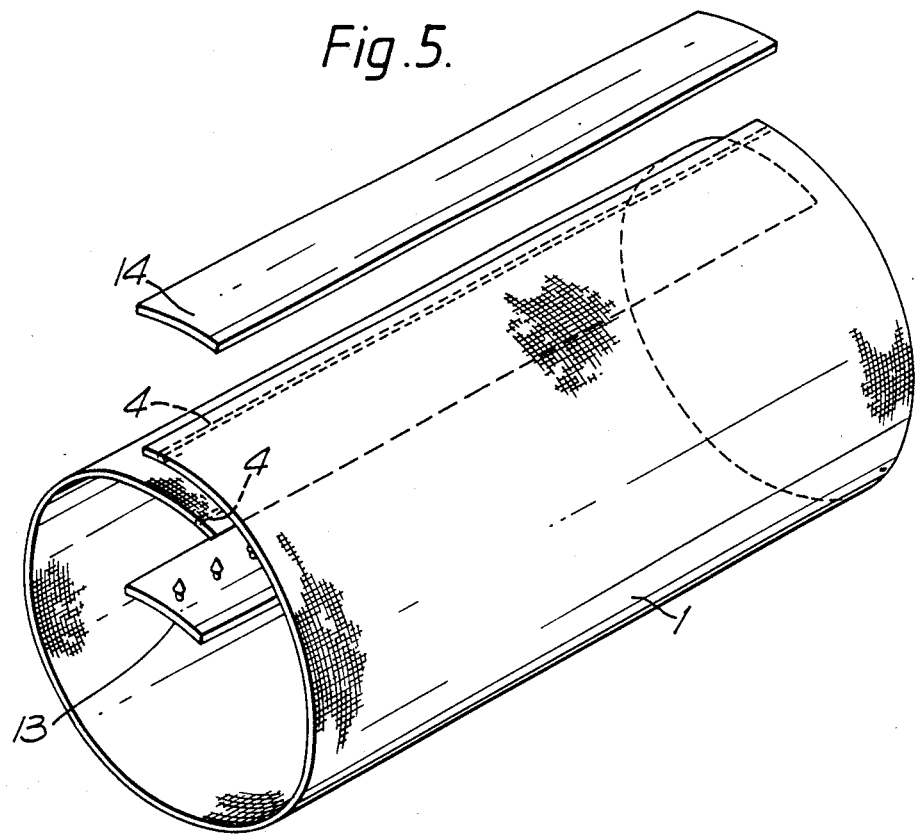
FIG. 5-7 show alternative closure designs to that of FIG. 2.

FIG. 5 shows an alternative closure design. Here a closure member 13, comprising a flap with projections thereon, is positioned within the sleeve and the projections forced through overlapping layers of the sleeve. The closure member is trapped within the fabric of the sleeve, i.e. the fabric cannot fray or run thereby allowing the member to move, because of the weld or bond lines 4. A cover 14 may be provided to engage the projections of the flap 13 that pass through the upper layer of the sleeve. The flap 13 may of course used on the outside of the sleeve such that the projections pass from outside the sleeve to the inside. Other closure designs may be used, such as staples or stitching, whereby some device that penetrates the fabric is trapped in the weave by welding or bonding and, if necessary, subsequent cross-linking.

A series of weld or bond lines 4 may be provided along the length of the sleeve and spaced apart circumferentially. In this way, the circumference of the installed sleeve can be chosen in the field; the projections of the flap 13 etc. are pushed through the layers of fabric at the desired positions.

Figure 6:
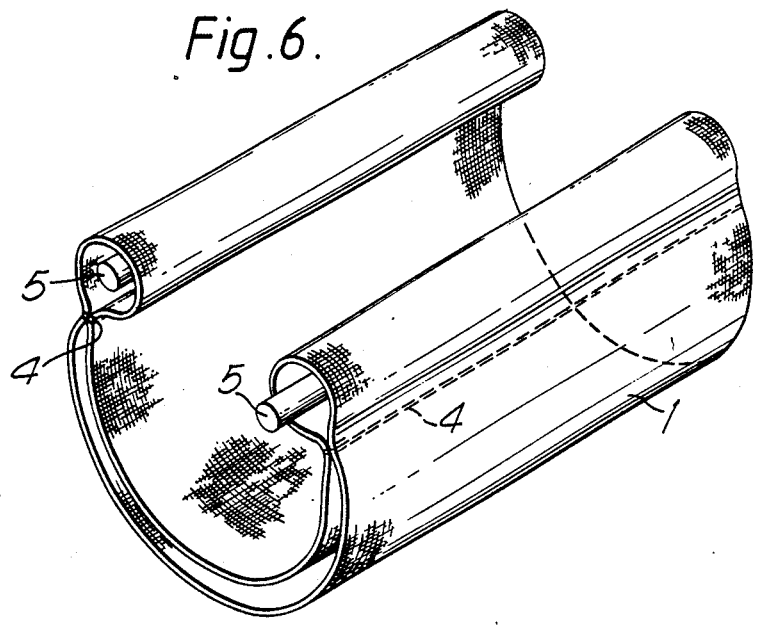

An alternative closure design in shown in FIG. 6. Here the sleeve is produced as a tube 15 and then flattened. Closure members 5 are inserted in what become the edges of the flattened tube. The closure members 5 are trapped by the welding or bonding along lines 4.

Figure 7:
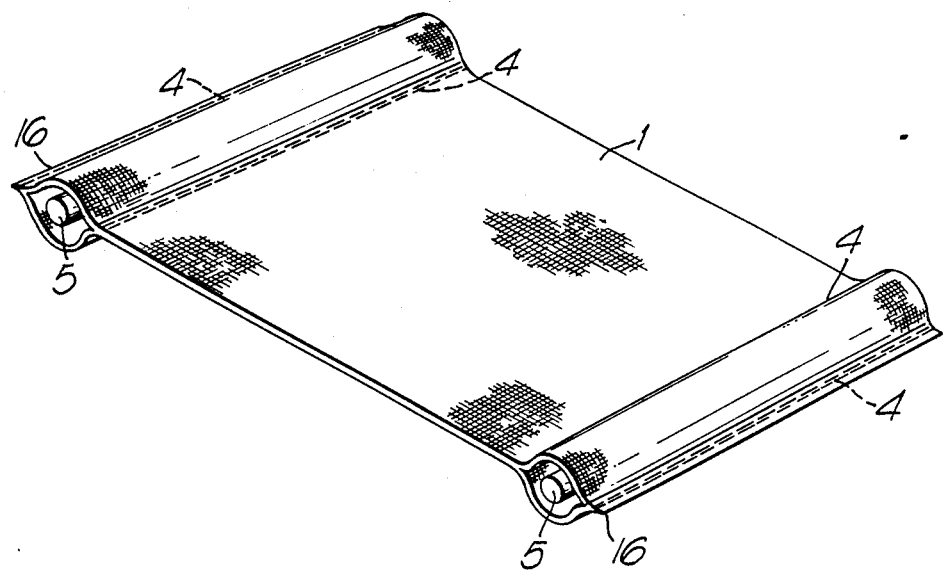

FIG. 7 shows yet another possibility. Here, pockets are woven into a single layer of fabric, and closure members 5 inserted therein. In this case the welding or bonding is carried out each side of each closure member 5 along lines 4. The end 16 of the fabric can be seen on the remote side of the members 5.

FIGS. 8–14 show various ways by means of which a closure member 5 may be positioned at an edge portion of a sleeve. In each case the weld or bond line is shown as an arrow 4. Dotted arrows indicate where additional, optional, bond or weld lines may be made although they are not preferred in the case of welding as explained above in connection with FIG. 3. These Figures are tranverse cross sections through about half of a sleeve width.

Figure 8:
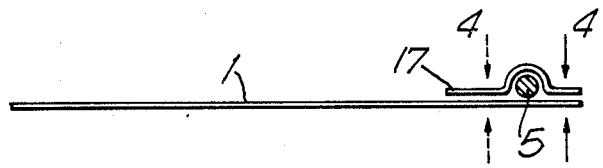
FIG. 8-14 show ways in which a closure member can be fixed at an edge portion of a sleeve.

In FIG. 8 a patch 17, optionally of fabric is positioned over the fabric, and attached by bonding or welding to trap the closure members 5.

Figure 9:
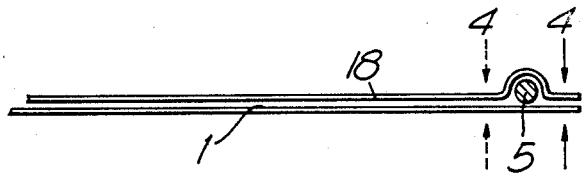

FIG. 9 shows a double layer of fabric bonded or welded together at selected positions to trap closure members 5. The lines 4 could be repeated at other positions across the fabric to provide pockets for insertion of members 5. In this way the sleeve could be cut to width in the field and the members inserted where appropriate.

Figure 10:
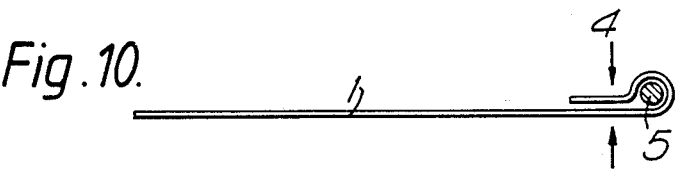

In FIG. 10, an end of a single layer of fabric is folded around a closure member and secured at 4.

Figure 11:
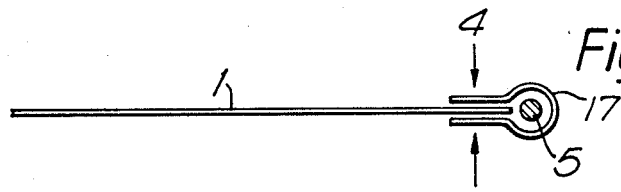

In FIG. 11, a patch 17, optionally fabric, is used around an end of the fabric to hold the closure member 5.

Figure 12:
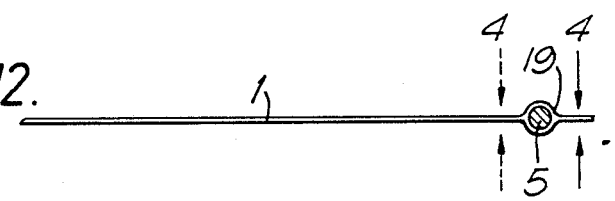

In FIG. 12, as in FIG. 3, the closure member is woven into the fabric.

Figure 13:
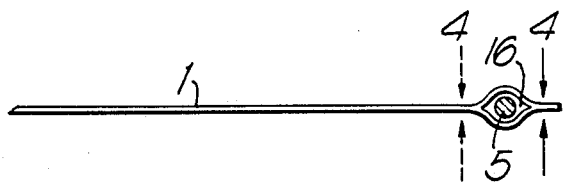

The embodiment of FIG. 13 corresponds to FIG. 7 in that pockets are woven into the fabric at position 19.

Figure 14:
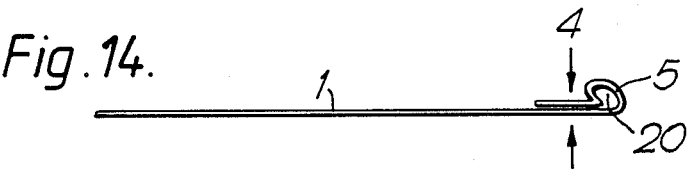

A closure member 5 is formed in FIG. 14 by a tight fold 20 in an end portion of the fabric.

In each of these designs, an identical closure member to that shown could be provided at the end portion of the sleeve omitted from the drawing. However, the two opposing edge portions of the sleeve could be different, for example one edge portion could carry a closure member that itself directly engages the other edge portion.

For the avoidance of doubt it is here indicated that the invention provides a welding or bonding and if necessary separate cross-linking, trapping technique to be used in conjunction with any one or more of the features disclosed herein. For example any one or more of the materials disclosed, any one or more of the weave or other fabric designs, and any one or more of the closure geometries or configurations may be selected.

What is claimed:

1. A method of producing a wrap-around article comprising a fabric and having a first closure member fixed with respect to the fabric at an edge of the article by means of which member, edge portions of the article can be held together to maintain the article in a wrapped around configuration, which method includes:
   (a) positioning said first closure member at said edge thereby forming a region of the article of increased thickness, wherein said positioning is carried out by a positioning selected from the group consisting of interweaving said first closure member into the fabric during the production of the fabric, inserting the first closure member into a pocket woven into the fabric, or mixtures of said positioning procedures, said region of increased thickness formed without turning back the fibers of the fabric around the closure member towards the edge opposite thereto;
   (b) affixing the fibers of the fabric to one another adjacent said first closure member, said affixing occurring on the side of the closure member closest to the edge adjacent to which the closure member is positioned, and wherein said affixing is selected from the group consisting of welding, bonding, or mixtures thereof; and
   (c) optionally the step consisting of cross-linking the weld or bond or mixtures of the weld or bond; thereby steps (b) and (c) locating said first closure member at said edge by preventing or reducing relative movement of fibers at said edge.

2. A method according to claim 1, in which formation of the bond in step (b) comprises a cross-linking chemical reaction, steps (b) and (c) occurring simultaneously.

3. A method according to claim 1, in which step (a) is carried out by interweaving said first closure member into the fabric during production of the fabric.

4. A method according to claim 3, in which the fabric is a woven fabric and step (a) is carried out by interweaving said first closure member as one or more warp ends during weaving of the fabric.

5. A method according to claim 1, in which the fabric is a woven fabric and step (a) is carried out by inserting the first closure member into a pocket woven into the fabric.

6. A method according to claim 1, in which the article is dimensionally heat-recoverable.

7. A method according to claim 6, in which the fabric is produced by a method which comprises weaving dimensionally recoverable warp or weft fibres and substantially nondimensionally recoverable respectively weft or warp fibres, the first closure member being positioned substantially perpendicular to the dimensionally recoverable fibres, so that the article when in a wrapped around configuration is dimensionally recoverable substantially only radially.

8. A method according to claim 7, in which the substantially non-dimensionally recoverable fibres are selected from the group consisting of glass or rayon or mixtures thereof, and additionally comprise a thermoplastic fibre at the edge portion.

9. A method according to claim 8, in which step (b) comprises welding or bonding said thermoplastic fibre to the dimensionally recoverable fibres.

10. A method according to claim 7, in which the fabric is woven from warp fibres comprising glass and from dimensionally-recoverable weft fibre.

11. A method according to claim 10, in which weft fibres are cross-linked.

12. A method according to claim 11, in which weft fibres comprise cross-linked film fibre.

13. A method according to claim 11, in which the article has a second closure member fixed with respect to the fabric at an edge of the sleeve, such that the first and second closure members can be held together to maintain the sleeve in a wraparound configuration.

14. A method according to claim 11, in which the article is produced by division of a fabric having two or more of said first closure members.

15. A method according to claim 14, in which the fabric is a woven fabric produced with the first closure member in the warp direction, the fabric being slit in the warp direction between two of said first closure members.

16. An article produced by a method according to claim 1.

17. An article produced according to claim 16, in which the article comprises said fabric and a matrix material, by means of which interstices between the fibres of the fabric are blocked.

18. An article produced according to a claim 16, in which the fabric has a recovery ratio of at least 20%.

19. In a method of producing a wrap-around recoverable article comprising a recoverable fabric, said article having at least one closure member fixed at an edge of the article, the improvement which comprises:
   weaving a closure member into the fabric during the fabric fabrication and prior to affixing the fibres of the fabric at the edge; and affixing the fibres of the fabric at the edge.

20. The article produced according to claim 19.

* * * * *